US011986842B2

(12) United States Patent
Hornek et al.

(10) Patent No.: US 11,986,842 B2
(45) Date of Patent: May 21, 2024

(54) CENTRIFUGE

(71) Applicant: Andreas Hettich GmbH & Co. KG, Tuttlingen (DE)

(72) Inventors: Matthias Hornek, Tuttlingen (DE); Andreas Hoelderle, Braeunlingen-Doeggingen (DE); Rainer Prilla, Messstetten (DE); Robert Hegele, Ravensburg (DE); Klaus-Guenter Eberle, Tuttlingen (DE)

(73) Assignee: ANDREAS HETTICH GMBH & CO. KG, Tuttlingen (DE)

( * ) Notice: Subject to any disclaimer, the term of this patent is extended or adjusted under 35 U.S.C. 154(b) by 792 days.

(21) Appl. No.: 16/973,429

(22) PCT Filed: Jun. 11, 2019

(86) PCT No.: PCT/EP2019/065255
§ 371 (c)(1),
(2) Date: Dec. 9, 2020

(87) PCT Pub. No.: WO2019/238711
PCT Pub. Date: Dec. 19, 2019

(65) Prior Publication Data

US 2021/0245174 A1 Aug. 12, 2021

(30) Foreign Application Priority Data

Jun. 14, 2018 (DE) ..................... 10 2018 114 289.7

(51) Int. Cl.
*B04B 9/08* (2006.01)
*B04B 7/02* (2006.01)
*B04B 9/12* (2006.01)

(52) U.S. Cl.
CPC .................. *B04B 9/08* (2013.01); *B04B 7/02* (2013.01); *B04B 9/12* (2013.01); *B04B 2007/025* (2013.01); *B04B 2009/085* (2013.01)

(58) Field of Classification Search
CPC .... B04B 9/08; B04B 7/02; B04B 9/12; B04B 2007/025; B04B 2009/085
See application file for complete search history.

(56) References Cited

U.S. PATENT DOCUMENTS 4,193,538 A * 3/1980 Schwarz ............... B04B 5/0414 494/10
6,063,018 A 5/2000 Letourneur
(Continued)

FOREIGN PATENT DOCUMENTS

DE 69810060 T2 10/2003
DE 102014112501 A1 3/2016
(Continued)

OTHER PUBLICATIONS

Japan Patent Office, Office Action, dated Mar. 7, 2023, pp. 1-10, Japanese Patent Application No. 2020-569193.
(Continued)

*Primary Examiner* — Walter D. Griffin
*Assistant Examiner* — Shuyi S. Liu
(74) *Attorney, Agent, or Firm* — WOODLING, KROST AND RUST

(57) ABSTRACT

The invention relates to a centrifuge (10), having a drive shaft (12), a rotor (14), which is mounted on the drive shaft (12) and is axially removable in a removal direction (26), a quick closure (20), which operates between the rotor (14) and the drive shaft (12) and by means of which the rotor (14) can be fixed relative to the drive shaft (12) in the removal direction (26), a thrust bearing (44) connected to the drive shaft (12), a locking bearing (24) connected to the rotor (14),
(Continued)

at least one blocking element (38), which, when activated, fixes the rotor (14) relative to the drive shaft (12) and operates between the locking bearing (24) of the rotor (14) and the thrust bearing (44) of the drive shaft (12). The pivot axis (38*b*) is aligned perpendicular to a straight line parallel to the drive shaft (12) and the blocking element (38) has a cardan shaft (38*a*), which is rotatable about the pivot axis (38*b*), and is connected to a bearing (40) via the cardan shaft (38*a*).

21 Claims, 8 Drawing Sheets

(56) References Cited

U.S. PATENT DOCUMENTS

| | | | |
|---|---|---|---|
| 9,409,187 | B2 | 8/2016 | Meisberger et al. |
| 10,486,170 | B2 | 11/2019 | Hornek et al. |
| 10,493,469 | B2 | 12/2019 | Hornek et al. |
| 10,632,475 | B2 | 4/2020 | Hoelderle et al. |
| 2017/0252754 | A1 | 9/2017 | Hoelderle et al. |

FOREIGN PATENT DOCUMENTS

| | | | |
|---|---|---|---|
| JP | 2011011118 | | 1/2011 |
| WO | 2011001729 | A1 | 1/2011 |

OTHER PUBLICATIONS

German Patent and Trademark Office, Search Report, dated Mar. 15, 2019, pp. 1-8, Application No. 102018114289.7.

European Patent Office, International Search Report, dated Sep. 9, 2019, pp. 1-5, Application No. PCT/EP2019/065255.

European Patent Office, Written Opinion of the International Search Report, pp. 1-6, Application No. PCT/EP2019/065255.

The State Intellectual Property Office of China, Office Action, dated Aug. 2, 2022, pp. 1-8, Application No. 201980039696.X, Title:Centrifuge.

The State Intellectual Property Office of China, English Translation of Office Action, dated Aug. 2, 2022, pp. 1-8, Application No. 201980039696.X, Title:Centrifuge.

* cited by examiner

CENTRIFUGE

This patent application is the national phase entry of PCT/EP2019/065255, international application filing date Jun. 11, 2019, which claims the benefit and priority of and to German patent application no. 10 2018 114 289.7, filed Jun. 14, 2018.

PCT/EP2019/065255, international application filing date Jun. 11, 2019 and German patent application no. 10 2018 114 289.7, filed Jun. 14, 2018 are incorporated herein by reference hereto in their entireties.

BACKGROUND OF THE INVENTION

The invention relates to a centrifuge.

Centrifuges having a removable rotor are already known, which centrifuges include means for axially locking the rotor on the drive shaft and which do not require any complex assembly steps or special tools to achieve such locking.

DE 10 2014 112 501 A1 for example discloses a generic centrifuge with a drive shaft and a rotor mounted on the drive shaft, which rotor can be axially removed in a removal direction. A quick-acting closure integrated into the rotor and the drive shaft is provided, which closure can be used to fix the rotor relative to the drive shaft in the removal direction. The quick-acting closure comprises a thrust bearing in the drive shaft, in which a locking part of the rotor engages, and at least one blocking element, which, when activated, fixes the rotor relative to the drive shaft. The blocking element operates between the locking part of the rotor and the thrust bearing of the drive shaft. The quick-acting closure has a power transmission element. The blocking element is operatively connected to an actuating element via the power transmission element. The quick-acting closure is unlocked by moving the actuating element, the power transmission element and the at least one blocking element relative to the locking part in a direction along a straight line parallel to the longitudinal axis of the drive shaft. During unlocking, the actuating element is moved in a direction along a straight line that is parallel to the longitudinal axis of the drive shaft and towards the drive shaft. For locking, the transmission element and the at least one blocking element on the one hand and the locking part on the other hand are relatively moved to wards each other in a direction along a straight line that is parallel to the longitudinal axis. The blocking element is mounted in an elastically pivotable manner by means of its solid state joint. This means that an axial force component must be generated when the rotor is inserted. Reducing this force to a minimum either requires an increase of the spring travel on the blocking element, which results in a larger installation space, or a reduction of the material thickness of the blocking element, which results in a smaller clamping area. This in turn diminishes the holding force and operational safety of the quick-acting closure, especially when production tolerances are taken into account. One possibility to counteract this would be to thicken the material in the clamping area of the blocking element. However, practice has shown that these areas can break in continuous operation.

Another problem with known centrifuges is that in the case of rotors having a low mass, the rotor's own weight cannot be used for locking because the axial force required for deflecting the blocking elements is too high, which may lead to operating errors.

Another centrifuge is disclosed in DE 698 10 060 T2. In this case, however, the blocking elements are adapted to be pivoted about joints that have vertically aligned axes, and the locking mechanism is different. This design has proven to be very stiff and prone to errors.

SUMMARY OF THE INVENTION

Therefore, it is the object of the invention to further develop a centrifuge in such a way that it has a quick-release system which is reliable even in continuous operation and which requires only a small actuating force for inserting the rotor. Preferably, once the rotor has been placed on the drive shaft, the locking function is to be achieved via gravity only and without any additional force, even for light-weight rotors.

The invention is based on the insight that this object can be accomplished simply by pivoting the blocking element from its locking position into an unlocking position and vice versa without any elastic deformation, and this is most easily accomplished using specifically not a solid state joint, but rather a normal joint acting around a horizontal pivot axis, in particular a hinge joint.

According to the invention, therefore, the pivot axis of the locking joint is aligned perpendicular to a straight line parallel to the longitudinal axis of the drive shaft and the blocking element is provided with a cardan shaft or a bearing rotatable about the pivot axis, with the cardan shaft engaging a bearing or the bearing comprising a cardan shaft. In a simple manner, the blocking element is thus mounted in a hinged bearing. This is a simple way of reducing the force to be applied, since there is no longer any elastic deformation as in the case of a solid state joint, and it is only the friction of the cardan shaft in the bearing that needs to be overcome. In addition, a pivoting movement about a horizontally aligned pivot axis as opposed to a vertically aligned pivot axis makes pivoting considerably easier. This makes it possible to connect the rotor to the drive shaft purely by gravity, without the need for any additional effort. Moreover, this opens up additional options regarding structural design.

According to an embodiment of the invention, the cardan shaft extends transversely to the longitudinal extent of the blocking element and along the pivot axis of the blocking element, about which the blocking element is pivotally connected to the bearing. When the blocking element moves about the pivot axis, this results in a relative movement between the blocking element with its cardan shaft and the bearing. This is a simple way of preventing the blocking element from being elastically deformed.

Preferably, the bearing is part of a force transmission element which is operatively connected to the actuating element.

The bearing can be designed as a radial bearing which facilitates production and ensures high fatigue strength.

In particular, the blocking element has two cardan shaft areas that extend perpendicularly to its longitudinal extent, with each shaft area being associated with one area of the bearing. This prevents misalignment due to one-sided mounting.

In order to create the conditions for increasing the holding force in the locking position, the blocking element has a blocking area on its one side with respect to the drive shaft area and a blocking mass on its other side, with the blocking mass preferably being heavier than the blocking area. This results in the blocking mass being urged outwards during operation of the centrifuge, and at the same time causes the blocking area of the blocking element to be urged inwards and thus into its locking position. This increases the safety of the quick-acting closure.

For this purpose, the center of gravity of the blocking element is within the blocking mass where it is located outside the intersection of an axis along the longitudinal extent by the pivot axis in such a way that during unlocking, a torque will be applied on the blocking area of the blocking element in the direction of its unlocking position.

Preferably, the blocking area of the blocking element is of a curved design and/or of a design that is adapted to the shape of the thrust bearing and/or locking bearing. This results in a compact connection which is of small size.

According to an embodiment of the invention, the blocking element has a guide recess, in particular a U-shaped guide recess, on its side remote from its free end. This helps reduce strain on the bearing, especially when there are load changes in the centrifuge. For this purpose, the force transmission element preferably has a guide that engages in the recess.

According to an embodiment of the invention, the blocking element is manufactured by powder injection molding, in particular metal powder injection molding (MIM), by precision casting, by pressure die casting, by cold forming, by plastic injection molding or by sintering. This allows blocking elements to be manufactured that are both lightweight and capable of withstanding permanent load.

For even more secure mounting of the rotor in the centrifuge, at least two blocking elements, preferably three blocking elements, are provided, with all blocking elements being of identical design and with each blocking element being arranged at a uniform distance from the respective adjacent blocking element. This prevents the quick-acting closure from creating unbalance together with the drive shaft and the rotor when mounted.

Preferably, the power transmission element is spring-loaded in the direction of the locking position. The force transmission element can be designed as a cylindrical piston guided in a cylinder.

The cylindrical piston can consist of several piston segments that are mounted movably relative to one another with respect to a cylinder axis.

Preferably a spring is provided which acts on the cylindrical piston. Alternatively, several springs are provided, with one spring thereof acting on a piston segment. Manufacturing tolerances can thus be compensated and it is ensured that the blocking element is in flat contact with the thrust bearing and the locking bearing.

In this case, the cylinder can be connected to the drive shaft resulting in the power transmission element being mounted on the drive shaft side. If the cylinder is connected to the rotor, the power transmission element is mounted on the rotor side.

During unlocking, the actuating element is preferably either moved towards the drive shaft or away from the drive shaft.

Additional advantages, features and possible applications of the present invention may be gathered from the description which follows in which reference is made to the embodiments illustrated in the drawings.

Throughout the descriptions, the claims and the figures of the drawing, those terms and associated reference signs are used as are stated in the List of Reference Signs below.

DESCRIPTION OF THE INVENTION

Figure 1:
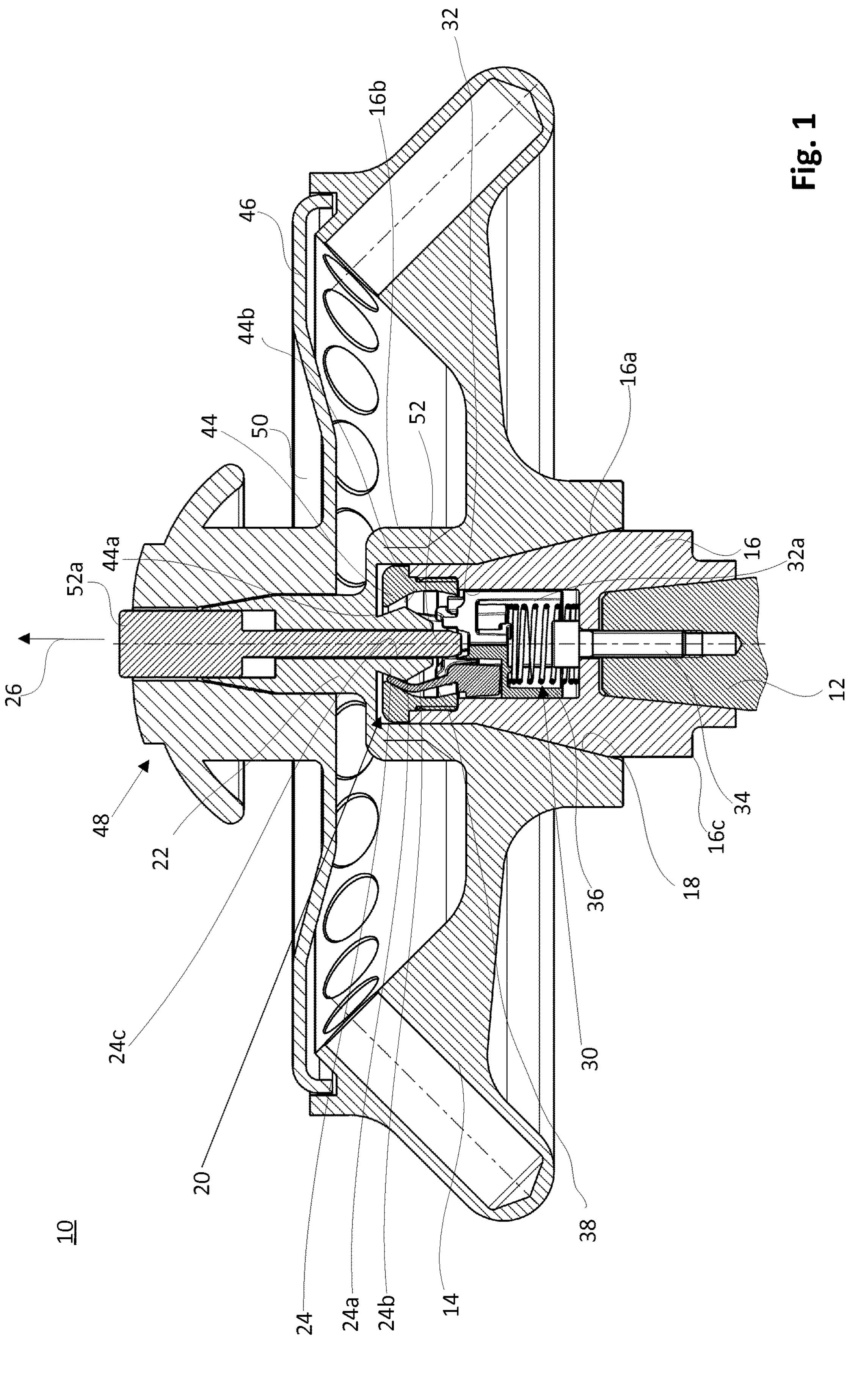
FIG. 1 is a sectional view of an angle rotor with a cover and a drive shaft taken along the center axis of the centrifuge, according to a first embodiment of the invention.
Figures 2A, 2B, 2C, 2D:
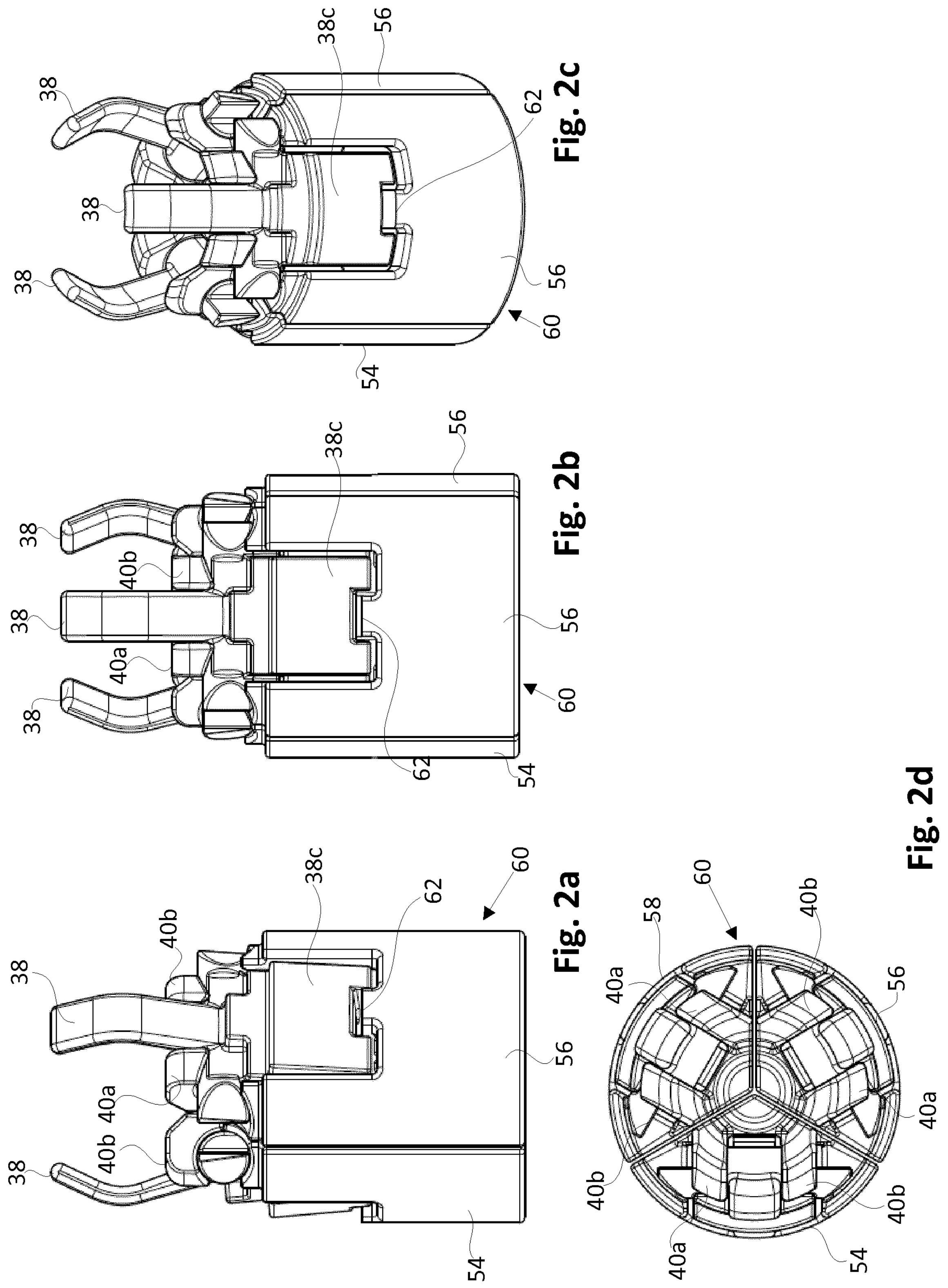
FIG. 2*a* is a first lateral view, in perspective, of a power transmission element with three blocking elements, according to a first embodiment of the invention.
FIG. 2*b* is a second lateral view, in perspective, of the power transmission element with the three blocking elements, according to a first embodiment of the invention.
FIG. 2*c* is a third perspective view, taken at an angle from above, of the power transmission element with the three blocking elements, according to a first embodiment of the invention.
FIG. 2*d* is a top view of the power transmission element with the three blocking elements, according to a first embodiment of the invention.
Figure 3:
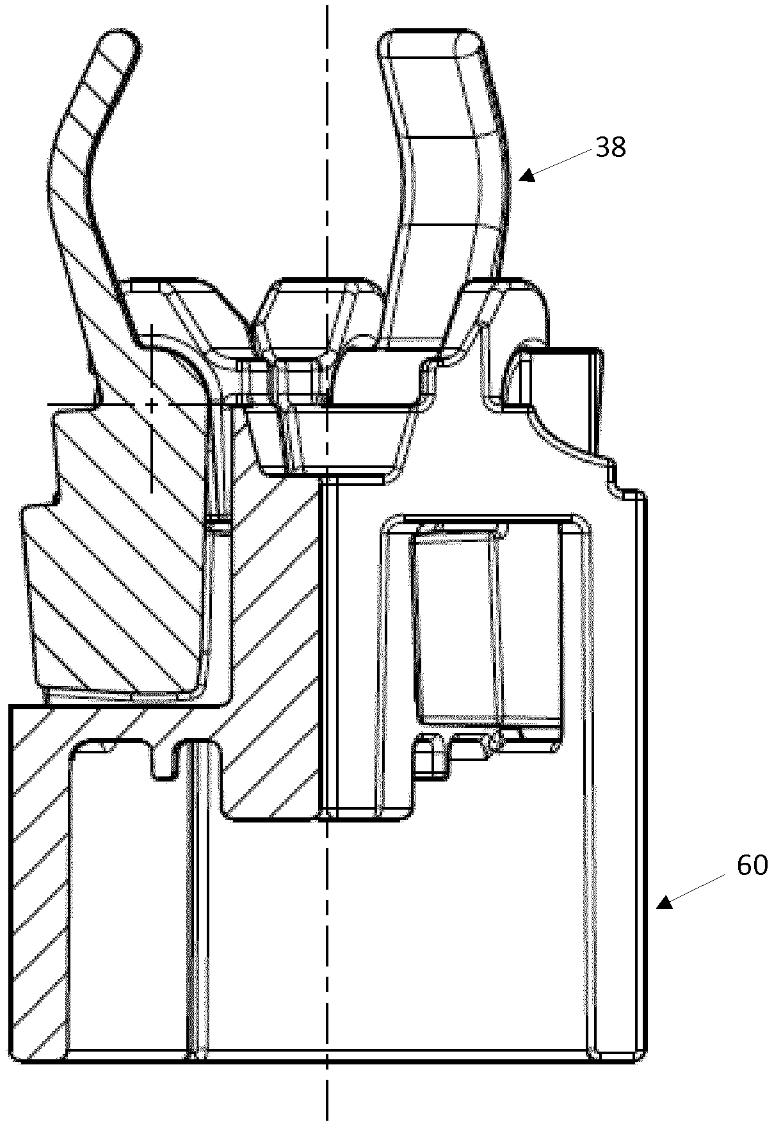
FIG. 3 is a lateral view, in perspective, partially cut with respect to FIG. 2*a;*
Figure 4C:
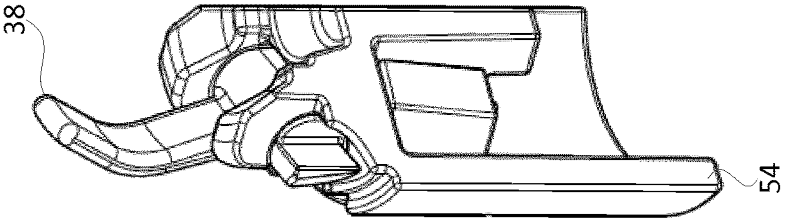
FIG. 4*c* is a perspective view, taken at an angle from above, of the part of the power transmission element of FIG. 4*a;*
Figure 4B:
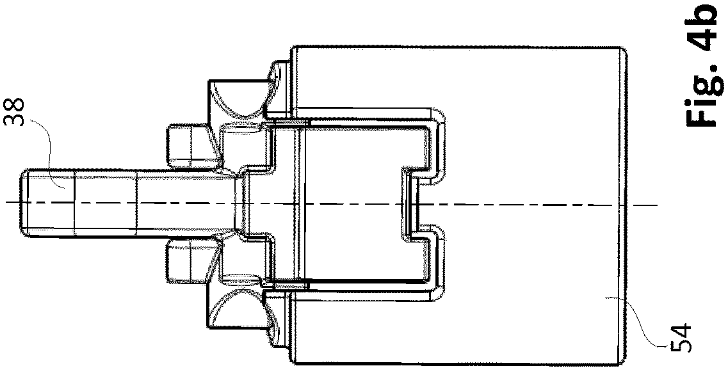
FIG. 4*b* is a lateral view of the part of the power transmission element of FIG. 4*a;*
Figure 4A:
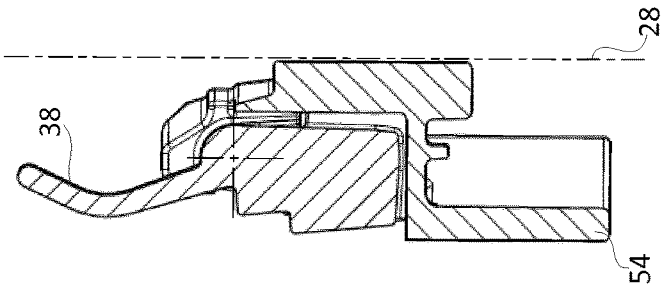
FIG. 4*a* is a sectional detail view of the power transmission element with the blocking element, according to the first embodiment of the invention.
Figure 4D:
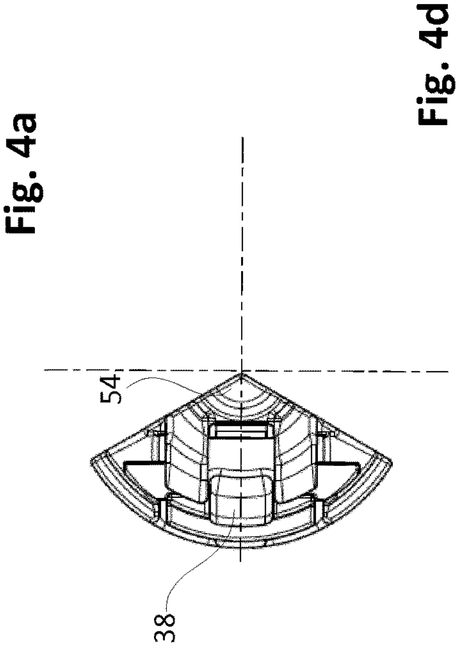
FIG. 4*d* is a top view of the part of the power transmission element of FIG. 4*a;*
Figure 5C:
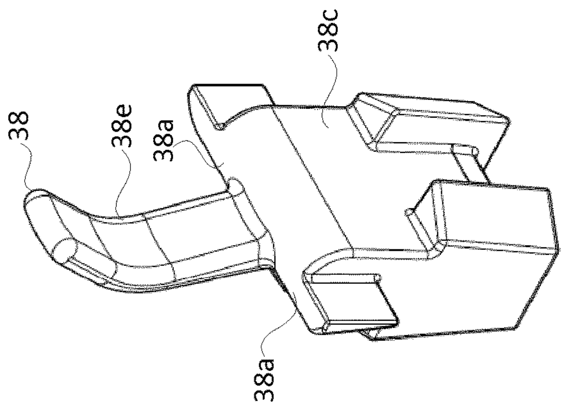
FIG. 5*c* is a top view, in perspective, of the blocking element of FIG. 5*a;*
Figure 5B:
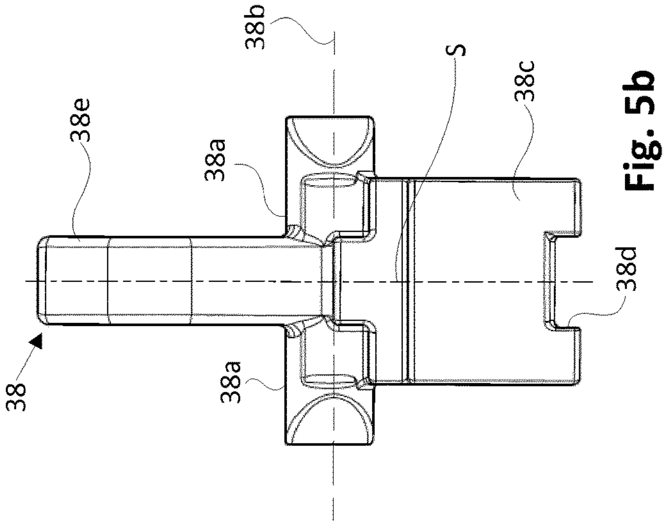
FIG. 5*b* is a front view of the blocking element of FIG. 5*a;*
Figure 5A:
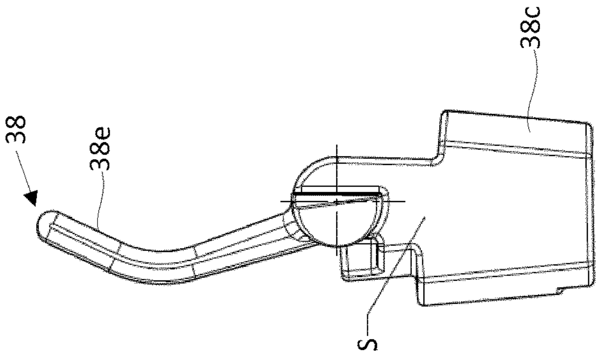
FIG. 5*a* is a lateral view of the blocking element according to the first embodiment of the invention.
Figure 5D:
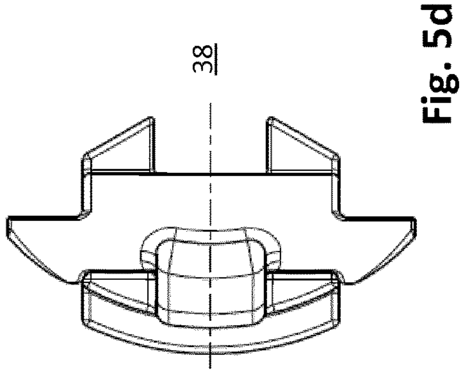
FIG. 5*d* a top view of the blocking element of FIG. 5*a;*
Figure 6A:
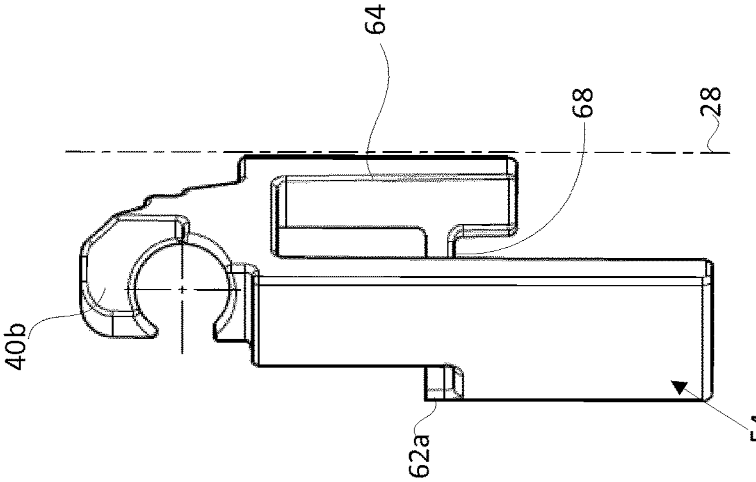
FIG. 6*a* is a lateral view of the part of the power transmission element without the blocking element, of FIG. 5*a;*
Figure 6B:
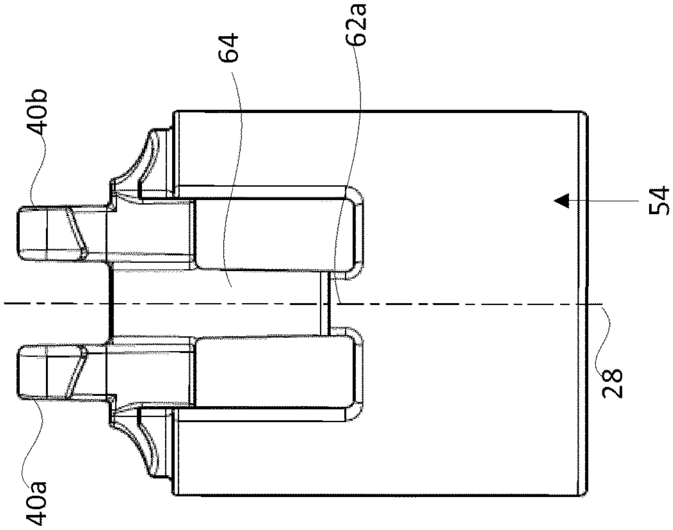
FIG. 6*b* is a front view of the part of the power transmission element of FIG. 6*a;*
Figure 6C:
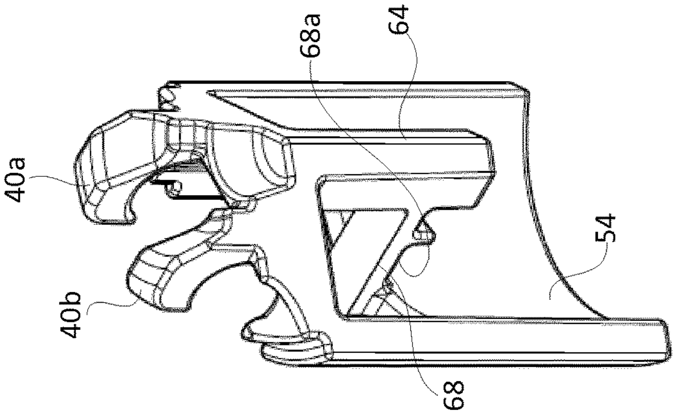
FIG. 6*c* is a perspective view, taken at an angle from above, of the part of the power transmission element of FIG. 6*a;*
Figure 6D:
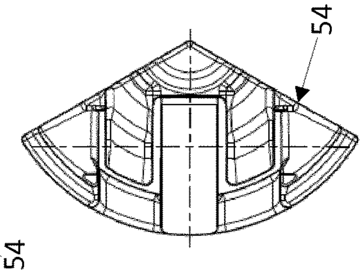
FIG. 6*d* is a top view of the part of the power transmission element of FIG. 6*a;*

The view of FIG. 1 schematically illustrates a vertical section of a centrifuge of the invention, which in its entirety is designated by reference numeral 10, having an angle rotor according to a first embodiment of the invention. For the sake of clarity, the substructure is not shown; only the upper portion of a drive shaft 12 is indicated schematically. A rotor 14 is arranged on the drive shaft 12.

According to the embodiment shown in the figures, the centrifuge 10 comprises the vertically aligned cylindrical drive shaft 12 and the adapter 16 arranged on the drive shaft 12 and non-rotatably connected to the drive shaft 12. A concentrically arranged rotor hub 18 of rotor 14 is mounted on the adapter 16. The adapter 16 and the rotor hub 18 and thus the drive shaft 12 and the rotor 14 are non-rotatably connected in a manner explained below. The rotor 14 is equipped with a quick-acting closure 20 which connects the rotor 14 with the adapter 16 and thus with the drive shaft 12.

The adapter 16 can also be designed to form a constructive unit with the drive shaft 12 and can thus be adapted to the rotor hub 18. Otherwise, the adapter 16 is optional. Alternatively, the drive shaft 12 can also be designed to directly accommodate the rotor hub 18.

The outer contour 16*a*, 16*b* of the adapter 16 is essentially adapted to the inner profile of the rotor hub 18 and, viewed from a shoulder 16*c*, initially extends in the form of an upwardly tapering cone 16*a*, then in the form of a cylinder 16*b*.

The inner profile of the rotor hub 18 extends upwards beyond the free end of the cylindrical part of the outer contour 16*b* of the adapter 16 and then merges into a rotor central area 22 that is non-rotatably connected to the rotor hub 18.

For axially fixing the rotor 14 on the adapter 16 and thus on the drive shaft 12, the rotor central area 22 has a locking part 24 that projects into the adapter 16 and has an outer contour of a diameter which, as viewed against the removal direction 26, first increases up to its widest point 24*a* and from there then decreases. The area of the outer contour in which the circumference decreases as viewed against the removal direction 26 forms a control surface 24*b*, the function of which will be explained below. The locking part 24 is spaced from the inner contour of the adapter 16. The locking part 24 has a bore 24*c* made in it, which bore 24*c* is concentric to a drive axis 28.

The adapter 16 is provided with a first central cylindrical recess 30 and a second central cylindrical recess 30 immediately following thereafter in the upward direction and having a wider diameter, resulting in an inner contour 32. The inner contour 32 has a longer higher section 32*a*, followed by a shoulder 32*b* at its rotor-side end. A shorter lower section 32*c* having a wider inner diameter than the longer section 32*a* adjoins this shoulder 32*b*.

The base of the recess 30 rests on the drive shaft 12. A threaded screw 34 and pins (not shown) connect the base to the drive shaft 12 at its front end. In this manner, the drive shaft 12 and the adapter 16 are non-rotatably connected to each other.

Located within the adapter 16, above the base of the recess 30, is the shaft-side part of the quick-acting closure 20. This part comprises a blocking unit 36 shown in FIGS. 2 to 6, in which three blocking elements 38 are each mounted in a radial bearing 40 and arranged at an equal distance from each other. The blocking unit 36 forms a piston 60 which is acted upon in the removal direction 26 by a spring 42 resting on the bottom of the recess 30. The piston 60 can be moved along the longitudinal axis of the drive shaft 12, as will be explained below.

A thrust bearing insert 44 is screwed into section 32*c* of the adapter 16. This insert extends upwards over the free end of section 32*c*, and its outer contour above section 32*c* is adapted to the inner contour of the rotor central area 22. The thrust bearing insert 44 has a bore 44*a*, the upper end of which is dimensioned such that the widest point 24*a* of locking part 24 can pass therethrough. Bore 44*a* then widens conically towards the bottom and forms an abutment surface 44*b*, the function of which will be explained below.

The inner contour 32*a*, 32*b*, 32*c* of adapter 16, together with the abutment surface 44*b* of the thrust bearing insert 44 and, with the rotor 14 in place on the drive shaft 12, the outer contour of the locking part 24, between them delimit a locking chamber within which the rotor 14 is locked and unlocked and thus fixed axially on the drive shaft 12.

Arranged above the rotor 14 is a removable cover 46 that forms a non-detachable unit with a handle 48. Handle 48 is mounted concentrically relative to the drive axis 28 on the top of cover 46, with a housing 50 of handle 48 having a rotationally symmetrical outer contour and a cylindrical inner contour and a centrally arranged recess 46*a* of cover 46, which recess 46*a* extends through the cover 46.

The rotor-side part of the quick-acting closure 20 is essentially arranged inside the handle 48. It comprises an actuating pin 52 that is longer in length than the axial extent of the handle 48 and which on the shaft side passes through the locking part 24 in bore 24*c* and comes into contact with a base area 36*a* of blocking unit 36. The free end of actuating pin 52 has an actuating knob 52*a*. The rotor is unlocked as a result of the interaction of handle 48 and actuation knob 52*a*. Actuation knob 52*a* must be depressed, with the handle 48 serving as a counter bearing for the user, then the rotor 14 can be removed, especially via the handle 48.

Figure 7:
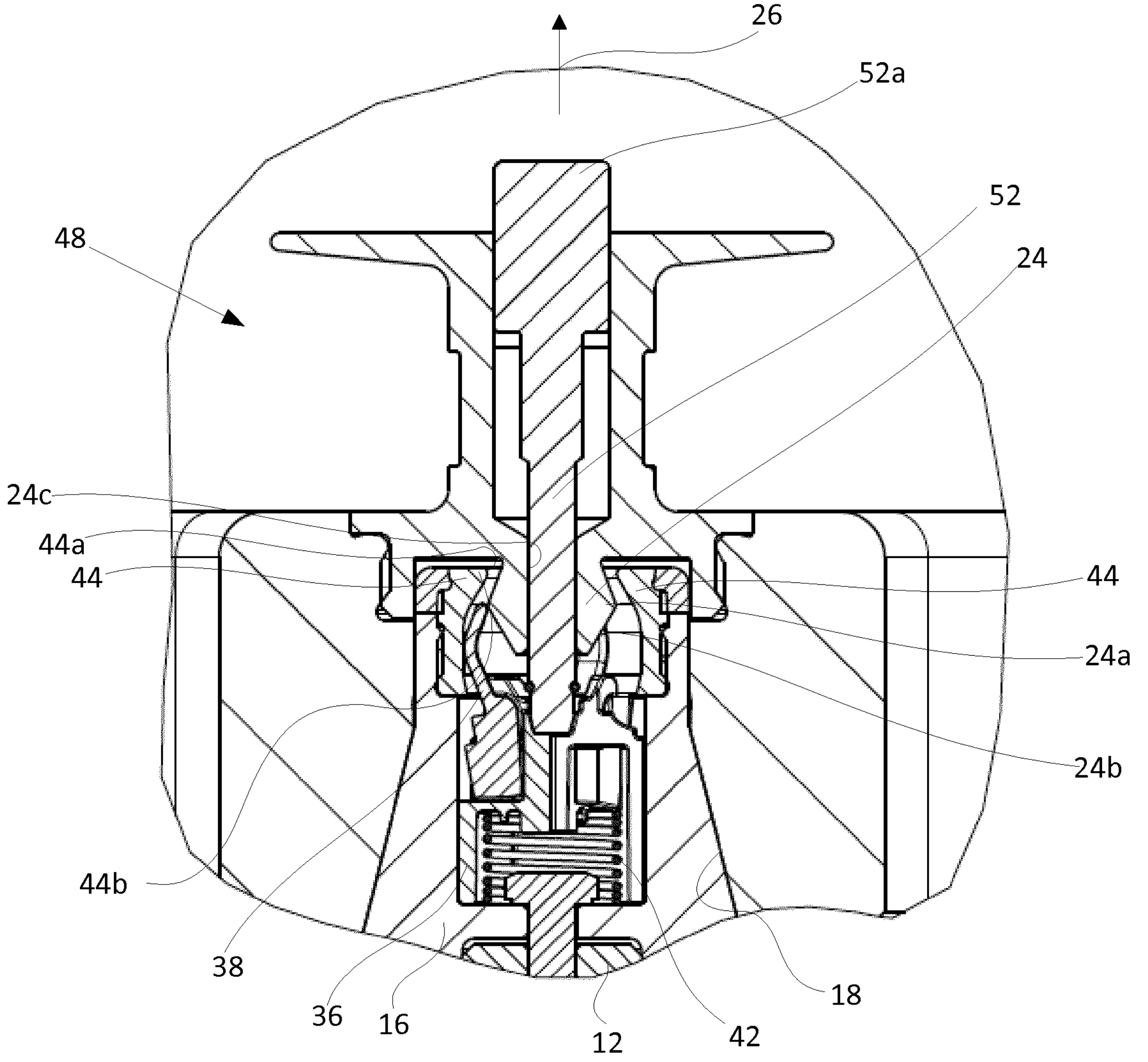
FIG. 7 is a sectional view of the installed power transmission element with blocking elements according to a first embodiment, in its unlocking position.

The view of FIG. 7 is an enlarged detail of a cross-section taken along the center axis of the centrifuge 10 of FIG. 1, showing the quick-acting closure 20 in its unlocked state, with rotor 14 still mounted on adapter 16. Actuating pin 52 is depressed. As a result, the piston-shaped locking unit 36, which has the actuating pin 52 in abutment with its base area on the shaft side, is displaced in the locking chamber against the removal direction 26 that is parallel to the longitudinal axis of the drive shaft 12, against the action of the spring 42. In the fully unlocked position of the blocking elements 38, their free ends abut on the control surface 24*b* of locking part 24, i.e. the blocking elements 38 are then outside their blocking position between locking part 24 and abutment surface 44*b*.

Figure 8:
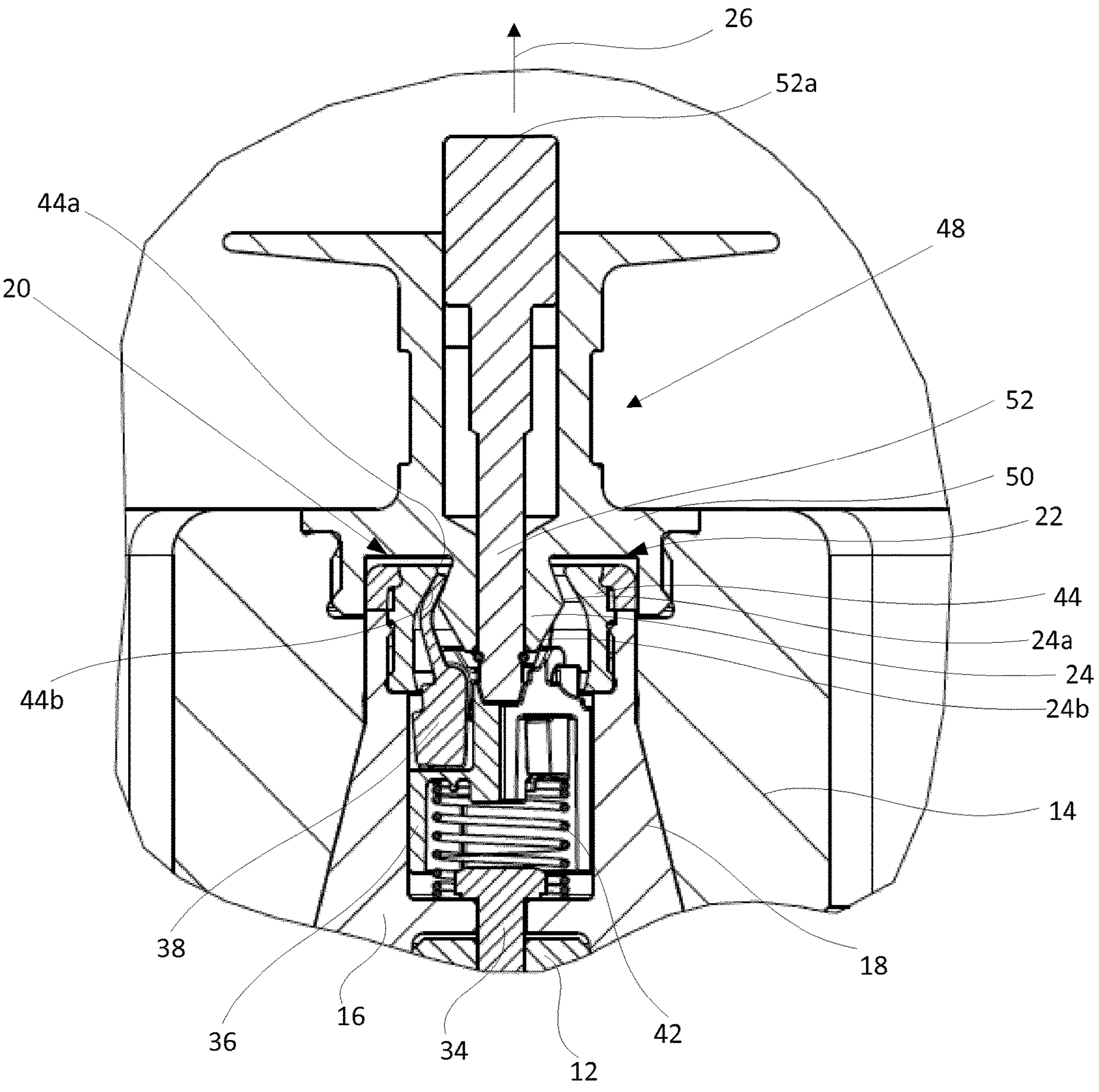
FIG. 8 is a sectional view according to FIG. 7, illustrating the locking position.

For locking, see FIG. 8, the pressure on actuating pin 52 is released against the removal direction 26. In doing so, the rotor 14 is brought into its locked position. The weight of the rotor 14 may be sufficient to cause the rotor 14 to move into its locked position. For light-weight rotors 14, the rotor may have to be pushed slightly into its locked position. Mounting the rotor 14 causes the locking unit 36 and thus also the blocking elements 38 mounted in the locking unit 36 to be displaced in the removal direction 26, i.e. along the longitudinal axis, due to the action of spring 42, or causes these components to counteract the weight of the rotor 14. The blocking elements 38 slide along the control surface 24*b* of the locking part 24 of the rotor 14, past its widest point 24*a*, into their blocking position between the outer contour of the locking part 24 and the abutment surface 44*b*. The weight of the rotor 14 counteracts the blocking elements 38 of the locking unit 36 sliding over the control surface 24*b*.

For locking, the blocking elements 38 are deflected laterally, i.e. pivoted about a horizontally extending pivot axis 38*b*, so as to enable them to pass the widest point 47*a*, after which, due to the center of gravity of the blocking elements 38, they will not fully resume their original orientation, as will be explained in more detail below, but will again bear against the outer contour of the locking part 24 and the abutment surface 44*b*. This results in the rotor 14 being fixed in centrifuge 10 in the axial direction, i.e. both in the removal direction and in the direction opposite thereto.

The view of FIG. 8 is an enlarged detail of a cross-section taken along the center axis of the centrifuge 10 of FIG. 1, showing the quick-acting closure 20 in its locked state. In contrast to the view of FIG. 7, this view shows the actuating pin 52 in the position into which it is automatically moved by the indirect action of the spring 42 when no external pressure is exerted on the pin 52 in the direction of the longitudinal axis of the drive shaft 12. The locking unit 36 and the blocking elements 38 mounted on the locking unit 36 are located in the area of the locking chamber near the rotor, due to the action of the spring 42 and the absence of any pressure exerted by the actuating pin 52 in the direction of the drive shaft 12. In their locking position, the blocking elements 38 are located between the outer contour of the locking part 24 and the abutment surface 44*b*. The quick-acting closure 20 is thus locked.

As is seen in particular in the views of FIGS. 2 to 6, the locking unit 36 consists of three piston segments 54, 56 and 58. All three piston segments 54, 56, 58 are of identical design and form a piston 60 as a force transmission element. The piston 60 is mounted in the cylindrical recess 30 of the adapter 16. The spring 42 acts on the piston 60. The piston segments 54, 56, 58 are mounted so as to be movable relative to each other along the drive axis 28. This allows manufacturing tolerances to be compensated and it is ensured that all the blocking elements 38 are operative in the locking position. This also ensures that all the blocking elements 38 are arranged at the same distance from each other.

Each piston segment 54, 56, 58 is equipped with a radial bearing 40 in order to allow pivoting about the horizontal pivot axis 38*b* and thus perpendicularly about a straight line parallel to the longitudinal axis of the drive shaft 12. The radial bearing 40 is formed by two bearing arms 40*a* and 40*b*, which in some areas engage around a cardan shaft 38*a* that extends transversely to the longitudinal extent of the blocking element 38. The cardan shaft 38*a* extends along the horizontally extending pivot axis 38*b* of the blocking element 38 and has two cardan shaft areas on each side. The blocking element 38 is adapted to pivot about this pivot axis 38*b* between an unlocking position, as shown in FIG. 7, and a locking position, as shown in FIG. 8. Below the cardan shaft 38*a*, the blocking element 38 is provided with a substantially rectangular mass element 38*c*, above the cardan shaft 38*a*, it is provided with the blocking area 38*e*. The pivot shaft 38*b* extends perpendicularly to a straight line parallel to the longitudinal axis of the drive shaft 12 and is therefore horizontally aligned when the longitudinal axis of the drive shaft 12 is vertical.

The piston segments 54, 56, 58 each have a recess 62 made in them that matches the outer contour of the mass element 38*c*. The recess 62 is designed in such a way that the mass element 38*c* is always located within the envelope of the piston 60, regardless of the pivotal position of the blocking element 38. This ensures that the piston 60 will not be impeded as it moves along the drive axis 28 in the recess 30 in the adapter 16, regardless of the pivotal position of the blocking element 38.

The recess 62 has a rectangular projection 62*a* in its lower area, which projection 62*a* extends into recess 62. Correspondingly, the mass element 38*c* has an associated U-shaped recess 38*d* designed to match the shape of the projection 62*a*.

The blocking area 38*e* is curved and designed to match the outer contour of the locking part 24.

The blocking mass 38*c* is heavier than the blocking area 38*e*. The center of gravity S of the blocking element 38 is located within the blocking mass 38*c* and is thus outside the point of intersection of an axis along the longitudinal extent of the blocking element 38 by the pivot axis 38*b*. This means that during unlocking, a torque acts on the blocking area 38*e* of the blocking element 38 in the direction of the unlocking position. During unlocking, i.e. when the actuating pin 52 is actuated and the piston 60 is moved against the force of the spring 42, the torque applied will thus cause the blocking element 38 to pivot about the horizontal pivot axis 38*b* from the locking position into the unlocking position.

The piston segment 54, 56, 58 is provided with a centrally arranged strut 64 which, together with the other piston segments 54, 56, 58 resting against each other, forms a cylindrical receptacle 66 for the actuating pin 52, see FIG. 6 in particular. A horizontal strut 68, which is connected to the vertical strut 64 and terminates within projection 62*a*, forms the contact surface 68*a* of the spring 42. In addition, the struts 64 and 68 act to stabilize the piston segment in 54, 56, 58. The vertical strut 64, together with the side surfaces of the piston segment 54, 56, 58, serves as a guide surface with respect to the other adjacent piston segments 54, 56, 58, which together form the piston 60, so as to enable the piston segments 54, 56, 58 to move relative to each other.

The blocking element 38 is manufactured by powder injection molding, in particular metal powder injection molding, by precision casting, by pressure die casting, by cold forming, by plastic injection molding or by sintering.

In an alternative embodiment not shown here, the blocking element 38 engages around the bearing 40, and the piston segments 54, 56 and 58 engage around the cardan shaft 38*a*. The blocking element 38 with the bearing 40 is adapted to be pivoted relative to the cardan shaft of the piston segment. Otherwise, the design of the piston segments 54, 56 is the same as in the embodiment described above.

LIST OF REFERENCE SIGNS

- 10 centrifuge
- 12 drive shaft
- 14 rotor
- 16 adapter
- 16*a* conical part of the outer contour of adapter 16
- 16*b* cylindrical part of the outer contour of adapter 16
- 16*c* shoulder of the outer contour of adapter 16
- 18 rotor hub
- 20 quick-acting closure
- 22 rotor central area
- 24 locking part
- 24*a* widest part of the outer contour of locking part 24
- 24*b* control surface of the outer contour of locking part 24
- 24*c* central bore in locking part 24
- 26 removal direction
- 28 drive axis
- 30 recess in adapter 16
- 32 Inner contour within adapter 16
- 34 threaded screw
- 36 control unit
- 38 blocking element
- 38*a* cardan shaft
- 38*b* pivot axis
- 38*c* mass element
- 38*d* recess in mass element 38*c*
- 38*e* blocking area of blocking element 38
- 40 radial bearing
- 40*a* left-side bearing arm
- 40*b* right-side bearing arm
- 42 spring
- 44 thrust bearing insert
- 44*a* bore in thrust bearing insert
- 44*b* abutment surface
- 46 removable cover
- 46*a* recess in cover 46
- 48 handle
- 50 housing of handle 48
- 52 actuating pin
- 52*a* actuating knob of actuating pin 52

54 first piston segment
56 second piston segment
58 third piston segment
60 piston
62 recess
62*a* projection in recess 62
64 strut
66 cylindrical receptacle
68 horizontal strut
68*a* contact surface
S center of gravity of blocking element 38

The invention claimed is:

1. Centrifuge (10), comprising:

a drive shaft (12), said drive shaft (12) includes an axis of rotation, a rotor (14) which is mounted on said drive shaft (12) and is axially removable in a removal direction (26), a quick-acting closure (20) which operates between said rotor (14) and said drive shaft (12) and by means of which said rotor (14) can be fixed relative to said drive shaft (12) in said removal direction (26), a thrust bearing (44) connected to said drive shaft (12), a locking bearing (24) connected to said rotor (14), at least one blocking element (38), which, when activated, fixes said rotor (14) relative to said drive shaft (12) and operates between said locking bearing (24) of said rotor (14) and said thrust bearing (44) of said drive shaft (12), said quick-acting closure (20) has an actuating element (52) and said blocking element (38) is operatively connected to said actuating element (52) such that said quick-acting closure (20) is unlocked by a movement of said actuating element (52) in a direction parallel to the longitudinal axis of said drive shaft (12) and a movement of said blocking element (38) in a direction parallel to longitudinal axis of said drive shaft (12) relative to said locking bearing (24) and/or relative to said thrust bearing (44) and that during locking, a relative movement of said blocking element (38), on the one hand, and of said locking bearing (24) and/or of said thrust bearing (44), on the other hand, toward each other occurs in a direction parallel to longitudinal axis of said drive shaft (12), with said blocking element (38) pivoting about a pivot axis (38*b*) between a blocking position and an unlocking position, said blocking element has a cardan shaft (38*a*), said cardan shaft (38*a*) rotatable about said pivot axis (38*b*), said pivot axis is aligned perpendicularly to a straight line parallel to said axis of said drive shaft (12), and said cardan shaft (38*a*) engaging a bearing (40).

2. Centrifuge according to claim 1, characterized in that said cardan shaft (38*a*) extends transversely to the longitudinal extent of said blocking element (38) and along said pivot axis (38*b*) of said blocking element (38), about which said blocking element (38) is pivotally connected to said bearing (40), and that a movement of said blocking element (38) about said pivot axis (38*b*) results in a relative movement of said blocking element (38) and said cardan shaft (38*a*) and said bearing (40).

3. Centrifuge according to claim 1, characterized in that said bearing (40) is part of a force transmission element (60) which is operatively connected to said actuating element (52).

4. Centrifuge according to claim 1, characterized in that said bearing (40) is a radial bearing.

5. Centrifuge according to claim 1, characterized in that said blocking element (38) has, perpendicular to its longitudinal extent, two cardan shaft areas (38*a*) that extend laterally to said longitudinal extent, which are each associated with an area of said bearing (40).

6. Centrifuge according to claim 1, characterized in that said blocking element (38) has a blocking area (38*e*) on one side with respect to said cardan shaft area (38*a*) and a blocking mass (38*c*) on the other side.

7. Centrifuge according to claim 6, characterized in that said blocking mass (38*c*) is heavier than said blocking area (38*e*).

8. Centrifuge according to claim 6, characterized in that said blocking mass (38*c*) urges said blocking area (38*e*) of said blocking element (38) into said blocking position during operation of said centrifuge.

9. Centrifuge according to claim 6, characterized in that:

said blocking element (38) has a center of gravity (S), said center of gravity (S) of said blocking element (38) is located within said blocking mass (38*c*) and is located outside a point of intersection of an axis along the longitudinal extent by said pivot axis (38*b*) such that, during unlocking, a torque will act on said blocking area (38*e*) of said blocking element (38) in the direction of said unlocking position.

10. Centrifuge according to claim 5, characterized in that said blocking area (38*e*) of said blocking element (38) is curved.

11. Centrifuge according to claim 5, characterized in that said blocking area (38*e*) matches the shape of the thrust bearing and/or of the locking bearing.

12. Centrifuge according to claim 3, characterized in that a mass element (38*c*) of said blocking element (38) has a U-shaped guide recess (38*d*).

13. Centrifuge according to claim 3, characterized in that said force transmission element has a guide projection that engages in a recess.

14. Centrifuge according to claim 1, characterized in that said blocking element (38) is produced by metal powder injection molding (MIM), by precision casting, by pressure die casting, by cold forming, by plastic injection molding or by sintering.

15. Centrifuge according to claim 1, characterized in that at least three blocking elements (38) are provided, with all blocking elements (38) being identical and each being arranged at a uniform distance from the respective adjacent blocking element.

16. Centrifuge according to claim 3, characterized in that said force transmission element (60) is spring-loaded in the direction of the locking position.

17. Centrifuge according to claim 3, characterized in that:

an adapter (16) fixed to said drive shaft (12);

a recess (30) in said adapter (16);

said recess (30) is cylindrically shaped;

said force transmission element (60) is a cylindrical piston which is guided in said cylindrically shaped recess (30).

18. Centrifuge according to claim 17, characterized in that said cylindrical piston (60) consists of several piston segments (54, 56, 58) which are mounted so as to be movable relative to one another about a cylinder axis.

19. Centrifuge according to claim 17, characterized in that a spring (42) acts on the cylindrical piston (60).

20. Centrifuge according to claim 18, characterized in that a spring acts on each piston segment (54, 56, 58).

21. Centrifuge according to claim 15, characterized in that during unlocking, said actuating element (52) is moved in a direction towards said drive shaft (12).

* * * * *